Jan. 31, 1950  A. Y. DODGE  2,496,201
SPEED RESPONSIVE CLUTCH MECHANISM
Filed Sept. 13, 1944  2 Sheets-Sheet 1
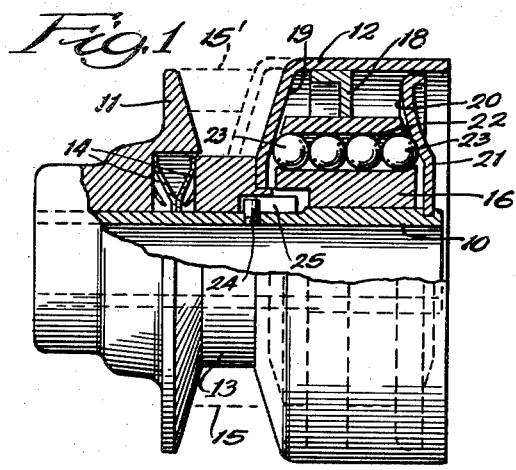
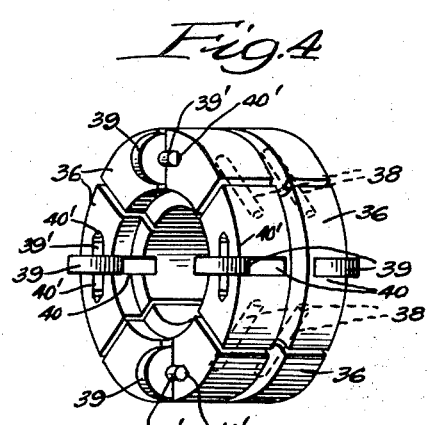
Inventor:
Adiel Y. Dodge,
By Dawson Ooms and Smith
Attorneys.

Jan. 31, 1950     A. Y. DODGE     2,496,201
SPEED RESPONSIVE CLUTCH MECHANISM
Filed Sept. 13, 1944     2 Sheets-Sheet 2
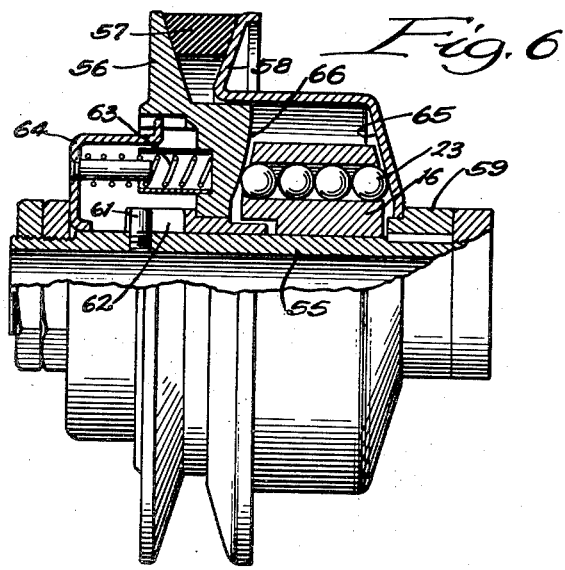
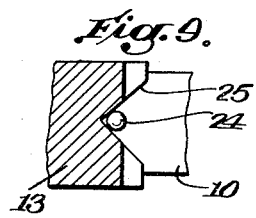
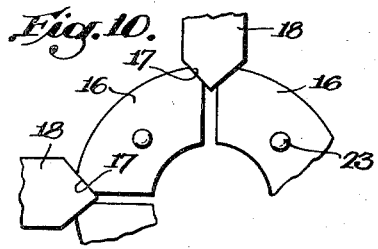
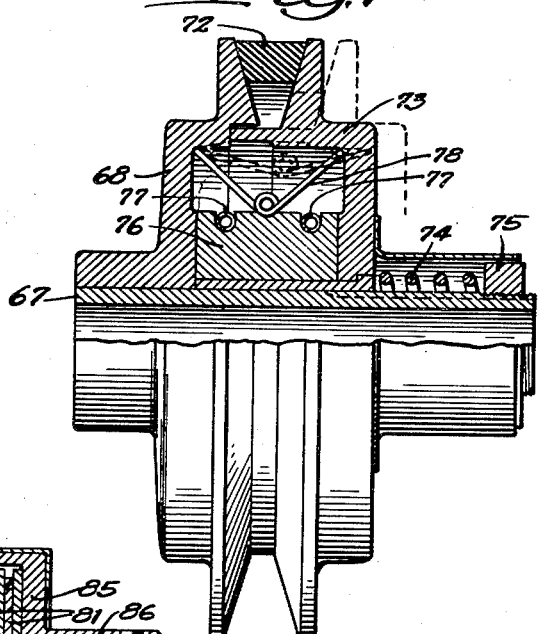
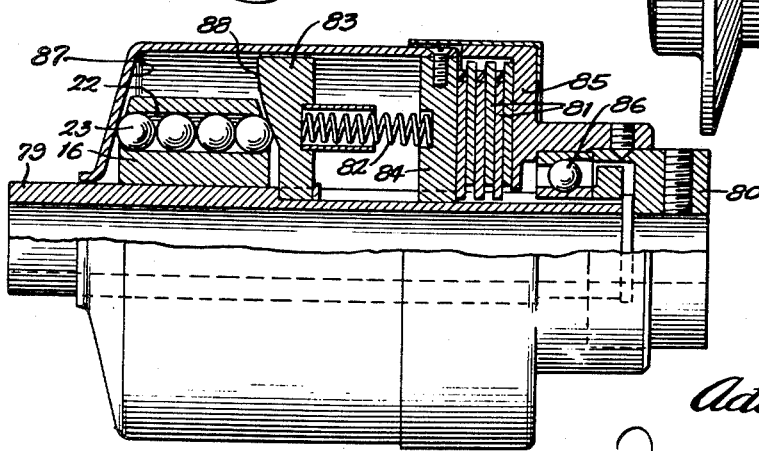
Inventor:
Adiel Y. Dodge,
By Dawson, Ooms & Booth,
Attorneys.

Patented Jan. 31, 1950

2,496,201

UNITED STATES PATENT OFFICE 2,496,201

SPEED RESPONSIVE CLUTCH MECHANISM

Adiel Y. Dodge, Rockford, Ill.

Application September 13, 1944, Serial No. 553,843

6 Claims. (Cl. 74—230.17)

This invention relates to speed responsive clutch mechanism and more particularly to a mechanism for establishing or interrupting a driving condition upon the attainment of a predetermined speed.

One of the objects of the invention is to provide a speed responsive clutch mechanism which is rapid and positive in operation and which can function either to establish or interrupt a driving condition in response to a predetermined speed.

Another object is to provide a speed responsive clutch mechanism employing cams to connect a weight to the clutch parts in which the cams are shaped to provide an increasing mechanical advantage as the weights move outwardly in response to centrifugal force.

Another object of the invention is to provide a speed responsive clutch mechanism which is controlled by a series of weights mounted in annular array.

Still another object is to provide a speed responsive clutch mechanism controlled by a toggle in the form of a resilient strip coiled at its center with straight legs extending at an angle to each other.

A still further object of the invention is to provide a speed responsive clutch mechanism which operates in response to speed to engage or disengage a belt such as a V-belt.

A further object is to provide a speed responsive mechanism to engage or disengage a V-belt in which the varying pressure of the belt on the pulley in response to varying loads is compensated.

The above and other objects and advantages of the invention will be more readily apparent from the following description when read in connection with the accompanying drawing, in which—

Figure 1 is an axial section with parts in elevation of one form of clutch mechanism embodying the invention;

Figure 2 is a perspective view of the weights of Figure 1;

Figure 3 is a view similar to Figure 1 of an alternative arrangement;

Figure 4 is a perspective view of the weights of Figure 3;

Figure 5 is a view similar to Figure 1 of another alternative arrangement;

Figures 6, 7, and 8 are views similar to Figure 1 illustrating the invention applied to an overspeed release mechanism; and Figure 9 is a partial sectional view illustrating the cam connection between one of the pulley parts and the shaft, and Figure 10 is a partial end view of the weight mechanism of Figs. 1 and 2.

The mechanism shown in Figure 1 is adapted to establish a driving connection between a pulley and a V-belt when the pulley obtains a predetermined speed. Preferably the pulley is the driving member and is formed with a hollow shaft 10 which may be connected in any desired manner to a source of power. The shaft 10 has rigidly secured thereto at one end a pulley member 11 having a tapered inner face adapted to engage one side of a V-belt. The pulley is completed by a second pulley member 12 having a pulley engaging surface diverging outwardly with respect to the surface of member 11 to engage the opposite side of the belt. The member 12 is preferably formed of relatively thin material as shown, and has an axially extending flange portion forming a housing for speed responsive control mechanism to be described later. The member 12 is secured as by welding to a sleeve or hub 13 which is slidably and rotatably connected to the shaft 10 as explained later.

The construction of Figure 1 is adapted to establish a driving relationship between the belt and pulley only after a predetermined pulley speed has been attained. Normally the members 11 and 12 are urged apart by a series of springs 14 acting to move the pulley member 12 away from the member 11 to widen the space between them. With the pulley parts separated as shown in full lines in Figure 1, the V-belt as indicated in dotted lines at 15 will ride loosely between the pulley members and no torque will be transmitted from the pulley to the belt. When the pulley members are urged together as shown in dotted lines, at the upper part of Figure 1, the belt as indicated at 15' will be squeezed between the surfaces thereof so that torque will be transmitted between the pulley and belt.

In order to control the pulley in response to speed, a plurality of centrifugal weights indicated generally at 16 are provided, rotatable with the pulley construction and operating to move the pulley members together in response to a predetermined speed. The weights are constructed as best seen in Figure 2 of curved segments arranged annularly and formed at their ends with parallel guide portions 17. The guide portions 17 slidably engage tapered guide plates 18 secured to the member 12 which hold the weights properly spaced and guide them in their radial movement.

The weights are adapted to move the member 12 toward the member 11 through cam surfaces 19 and 20 formed respectively on the member 12 and on a ring or disc 21 rigidly secured to the shaft 10. The weights are mounted between the cam surfaces which converge outwardly so that as the weights move out in response to speed they will cam the member 12 to the left.

In order to reduce friction between the weights and the cam surfaces, the weights are formed with axially extending bores 22 in which balls 23 are mounted. The weights are preferably peened over adjacent the ends of the bores 22 to hold the balls in place during handling and assembly. An even number of balls such as two, four or six are employed in each of the bores so that the balls will have rolling contact with each other and with the cam surfaces.

According to one important feature of the invention the cam surfaces are so shaped as to provide an increasing mechanical advantage between the weights and the pulley member as the weights move out. For this purpose the cam surface 20 is curved to be more nearly radial at its outer than at its inner portion. With this construction, when the weights start to move out in response to speed, their mechanical advantage over the pulley member 12 increases so that a smaller force on the weights will hold them in their outer position than is required to initiate their movement. Therefore, when the weights start to move in response to a predetermined speed they will move rapidly to their outermost position so that the pulley members will engage the belt with a minimum period of slip to eliminate wear and scuffing on the belt. Similarly, once the weights start to move in from their outermost position they will move to their full inward position rapidly so that the pulley members will disengage the belt with a minimum period of slipping.

If it is not desired to have the construction responsive to the torque transmitted as well as to speed, compensating means may be provided to compensate for the increasing end thrust produced by a V-belt drive on increasing load. As shown in Figure 1, such compensating means is provided by a cam connection between the pulley member 12 and the shaft 10. The tubular shaft 10 rigidly carries a driving pin 24 fitting into a cam notch 25 formed in the sleeve or hub 13. The notch 25 has diverging sides which converge toward the pulley member 11 so that an increased torque will act thru the surface of the notch and the pin 24 to urge the pulley member 12 to the left toward the pulley member 11 with a force proportional to the torque. Thus this compensates for the increased axial force of the V-belt under an increased load so that the pulley will operate in response to speed and will be substantially unaffected by torque variations.

Figure 3 illustrates a modified construction for controlling the connection between two shafts 27 and 28. In this construction the shaft 27 carries a sleeve 29 to which a series of clutch discs 31 are slidably keyed. The discs 31 alternate with similar clutch discs 32 slidably keyed to a housing part 33 which is rigidly connected to the shaft 28. The clutch discs 31 and 32 are adapted to be pressed together by end members 34 and 35 held within the housing part 33. The end member 34 is rigidly held in the housing by a ring 34 threaded in the housing part and the member 35 is keyed or splined in the housing part for axial movement therein.

The clutch is controlled by a series of weights 36 particularly shown in Figure 2 which are formed with a circumferential groove to receive a garter spring 37 which holds the weights radially inward. The weights are connected by guide pins 38 slidably fitting into bores in the ends of the weights which guide the weights in their radial movement and insure equal radial movement of the several weights. Preferably two axially spaced pins are employed as shown to prevent tilting of the weights.

The weights lie between and slidably engage cam surfaces 33' and 35' on the member 33 and 35 respectively. One of the cam surfaces, shown at 35', is curved in the same manner as the cam surface 20 of Figure 1 to provide an increasing mechanical advantage as the weights move out as explained above in connection with Figure 1.

Friction is reduced in this construction by rollers 39 carried radially extending slots 40 in the weights. The rollers project beyond the faces of the weights on the opposite sides thereof and are rotatably connected to the weights by trunnions or axles 39' on the weights which ride in slots or sockets 40' in the weights.

In operation of this construction when the weights start to move out the end member 35 will be cammed to the left to press the clutch discs 31 and 32 together so that a driving connection will be established between the shafts 27 and 28. Due to the increasing mechanical advantage provided by the curved cam surface 35' the weights will move out rapidly once they start so that the clutch will be engaged quickly with a minimum period of slipping.

Figure 5 illustrates an alternative construction operating in substantially the same manner as that of Figure 1. In this construction a tubular shaft 41 rigidly carries a pulley member 42. A second pulley member 43 is slidably keyed or splined to the shaft and is urged away from the pulley member 42 by one or more springs 44. As shown, the pulley members 42 and 43 may be held against relative rotation by pins 45 extending axially between them.

The pulley member 43 is adapted to be urged toward the member 42 by a series of centrifugal weights 46 formed in arcuate segments to fit around the shaft 41 and connected together by circumferentially extending pins 47. One or more garter springs 48 may fit in grooves on the outside of weight members to urge them toward the shaft. The weight members are connected to the pulley member 43 by a toggle mechanism acting between the member 43 and a ring 49 which is rigidly connected to the shaft. The toggle mechanism may be a standard hinge member but is preferably formed as shown, of flexible spring wire coiled at its central portion as indicated at 53 and having straight leg portions 54 extending at an angle from the central coil 53. The spring toggle members may be formed individually or a plurality of them may be formed in series from a continuous spring strip. When individual toggle members are used, the ends of the leg portions may be bent over at right angles to engage the pulley member 43 and the ring 49 to hold the toggle members against tilting.

In operation as the weights 46 move out they move the central portions 53 of the toggle members out tending to straighten the toggle members so that the pulley member 43 will be moved toward the pulley member 42. It will be noted that as the toggle members become more nearly straight they provide an increasing mechanical advantage of the weights over the pulley member so that it will be moved promptly to a position to engage the belt with a minimum period of slipping.

The several embodiments so far described all operate to provide establishment of a driving condition once a predetermined speed has been obtained. Figures 6, 8 and 7 illustrate similar arrangements with the difference that in these constructions driving engagement is normally established by springs or the like and is released when the speed is above a predetermined maximum.

In the construction shown in Figure 6 a tubular shaft 55 slidably carries a pulley member 56 which is adapted to engage one side of a V-belt 57. A second belt member 58 is secured to a collar 59 which is connected to the shaft thru a pin 61 and a cam notch 62. One or more springs 63 act between a collar 64 fixed on the shaft 55 and the pulley member 56 to urge the pulley member 56 toward the member 58 drivably to engage the V-belt 57.

The pulley member 56 is adapted to be moved away from the member 58 in response to a predetermined speed by a series of weight members which may be identical with the corresponding weight members of Figures 1 and 2 and parts of which are indicated by the same reference numerals. The balls 23 carried by the weight members act between the cam surfaces 65 formed on the pulley member 58 and an opposing curved cam surface 66 on the pulley member 56. The surface 66 is curved as shown so as to be more nearly radial adjacent its outer than adjacent its inner portion.

In operation the pulley member 56 is normally urged to the right to engage the belt 57 by the springs 53. When the pulley exceeds a predetermined speed the weights 16 will move out to urge the pulley member 56 to the left to disengage the belt. It will be noted that this operation will take place rapidly so that a minimum period of slip occurs. It will further be noted that the cam mechanism formed by the pin 61 and notch 62 compensates for variations in load on the belt as explained in connection with Figure 1.

Figure 7 illustrates a similar construction for disengaging a V-belt in response to a predetermined speed. In this construction a tubular shaft 67 is connected to a pulley member 68 thru a pin 69 and cam slot 71. The pulley member is adapted to engage one side of a V-belt 72 whose opposite side is engaged by a pulley member 73 which is splined or keyed to the shaft 67. A spring 74 acting between the pulley member 73 and a threaded stop collar 75 urges the pulley member 73 to the left to engage the belt 72. A series of weights 76 similar to the weights 46 of Figure 5 are arranged between the pulley members around the shaft 67 and are held inwardly by garter springs 77. Toggle members indicated generally at 78 which are similar to the toggle members of Figure 4 connect the weights to the pulley members to provide an increasing mechanical advantage therebetween as the weights move out.

In operation of this construction the pulley members normally engage the belt under the influence of spring 74 to establish a driving connection therebetween. When the pulley exceeds a predetermined speed the weights 76 will move out to separate the pulley members so that they will disengage the belt, this action occurring rapidly with a minimum of slip due to the increasing mechanical advantage provided by the toggle member as it straightens.

Figure 8 shows a construction for disengaging a disc type clutch in response to a predetermined speed. In this construction a tubular shaft 79 is adapted to be connected to a driven member 80 thru interleaving clutch discs 81 which are splined or keyed respectively to the members 79 and 80. The clutch discs are normally urged together by springs 82 acting between a collar 83 secured to the shaft 79 and an end plate 84 acting against one side of the clutch discs. The opposite side of the clutch disc assembly engages a radial flange portion 85 on the member 80, the members 79 and 80 being connected together thru a thrust bearing 86.

The clutch is adapted to be disengaged by speed responsive mechanism including a series of weights similar to the weights shown in Figure 2 and parts of which are indicated by the same reference numerals. The rollers 21 carried by the weights 16 engage a cam surface 87 formed on a housing member which is secured to the end plate 84 and a curved cam surface 88 on the collar 83. It will be noted that the surface 88 is so curved that its outer portion is more nearly radial than its inner portion so that the weights 16 will have an increasing mechanical advantage over the springs 82 as the weights move out.

In operation the springs 82 normally hold the clutch discs 81 in driving engagement to connect the shaft 79 to the member 80. When the clutch is turning above a predetermined speed the weights 16 will move out to cam the member 87 to the left thereby moving the end plate 84 to the left to relieve the pressure against the clutch discs. It will be noted that this operation occurs rapidly so that the discs are disengaged quickly with a minimum period of slip.

While several embodiments of the invention have been shown and described in detail herein it will be understood that these are illustrative only and are not intended as a definition of the scope of the invention, reference being had for this purpose to the appended claims.

What is claimed is:

1. A speed responsive clutch mechanism comprising a pair of rotatable pulley members movable relatively together drivingly to engage a belt between them and relatively apart to release the belt, a spring urging the pulley members in one direction, a series of weight carried by the pulley members and movable outward in response to centrifugal force, a pair of cam members connected to the pulley members respectively and having outwardly converging cam surfaces one of which is curved to be more nearly radial at its outer than at its inner part, and anti-friction parts on the weights engaging the cam surfaces to urge the pulley members against the first-named spring as the weights move out.

2. A speed responsive clutch mechanism comprising a pair of pulley members having diverging belt engaging surfaces and relatively movable axially together to engage a V-belt between them, a shaft on which the pulley members are mounted for relative axial movement, means responsive to the speed of the shaft to move the pulley members axially relative to each other, and one of the pulley members being rotatable on the shaft, and interengaging cam parts on the shaft and said one of the pulley members, the cam parts on said pulley member formed with cam surfaces lying at an acute angle to a plane normal to the shaft axis and converging toward the other pulley member to urge said one of the pulley members axially of the shaft and toward the other pulley member with a force proportionate to the load imposed on said one of the pulley members by the belt.

3. A speed responsive clutch mechanism comprising a pair of pulley members having diverging belt engaging surfaces and relatively movable axially together to engage a V-belt between them, a shaft on which the pulley members are mounted for relative axial movement, one of the pulley members being rotatable on the shaft, and interengaging cam parts on the shaft and said one of the pulley members, the cam parts on said pulley member formed with cam surfaces lying at an acute angle to a plane normal to the shaft axis and converging toward the other pulley member to urge said one of the pulley members axially of the shaft and toward the other pulley member with a force proportionate to the load imposed on said one of the pulley members by the belt, a centrifugal weight rotatable with the shaft and movable outward in response to centrifugal force, and means operatively connecting the weight to the pulley members to move them axially relative to each other as the weight moves.

4. A speed responsive clutch mechanism comprising a pair of pulley members having diverging belt engaging surfaces and relatively movable axially together to engage a V-belt between them, a shaft on which the pulley members are mounted for relative axial movement, cam means connecting one of the pulley members to the shaft to urge it toward the other pulley member with a force proportional to the load on the belt, a centrifugal weight rotatable with the shaft and movable outward in response to centrifugal force, and means operatively connecting the weight to the pulley members to move them axially relative to each other as the weight moves, said means including a part having a varying effective angle to increase the mechanical advantage of the weight over the pulley members as the weight moves out.

5. A speed responsive clutch mechanism comprising a pair of rotatable members movable axially relative to each other, a plurality of weights loosely assembled in annular array adjacent one of the members and formed at their ends with parallel guide surfaces, guide parts carried by said one of the members formed with angular guide surfaces to engage the guide surfaces on the ends of adjacent weights, and means operatively connecting the weights to one of the members to move it axially relative to the other member.

6. A speed responsive clutch mechanism comprising a pair of rotatable members movable axially relative to each other, a plurality of weights loosely assembled in annular array adjacent one of the members and formed at their ends with parallel guide surfaces, guide parts carried by said one of the members formed with angular guide surfaces to engage the guide surfaces on the ends of adjacent weights, and means operatively connecting the weights to one of the members to move it axially relative to the other member, said means including a part having a variable effective angle to increase the mechanical advantage of the weight over said one of the members as the weight moves out.

ADIEL Y. DODGE.

REFERENCES CITED

The following references are of record in the file of this patent:

UNITED STATES PATENTS

| Number | Name | Date |
|---|---|---|
| 1,167,850 | Smith | Jan. 11, 1916 |
| 1,682,493 | Ehrenfeld | Aug. 29, 1928 |
| 1,698,322 | Stobe | Jan. 8, 1929 |
| 1,714,748 | Wright | May 28, 1929 |
| 1,766,227 | Russell | June 24, 1930 |
| 1,849,177 | Dickson | Mar. 15, 1932 |
| 1,865,772 | Lyman | July 5, 1932 |
| 1,868,001 | Defays et al. | July 19, 1932 |
| 1,883,872 | Bradford | Oct. 25, 1932 |
| 2,010,925 | Nakashian | Aug. 13, 1935 |
| 2,016,643 | Lowndes | Oct. 8, 1935 |
| 2,088,804 | Molyneux | Aug. 3, 1937 |
| 2,144,443 | Thomas | Jan. 17, 1939 |
| 2,155,351 | Paulus | Apr. 18, 1939 |
| 2,173,661 | Perrine | Sept. 19, 1939 |
| 2,180,217 | Thomas | Nov. 14, 1939 |
| 2,246,769 | Wemp | June 24, 1941 |
| 2,283,267 | Kohl | May 19, 1942 |
| 2,294,777 | Heyer | Sept. 1, 1942 |